3,000,701
PRODUCTION OF SODIUM BORATES
Nelson P. Nies, Laguna Beach, Calif., assignor to United States Borax & Chemical Corporation, Los Angeles, Calif., a corporation of Nevada
No Drawing. Filed May 13, 1960, Ser. No. 28,846
3 Claims. (Cl. 23—59)

The present invention relates as indicated to the production of sodium borates and has more particular reference to an improved "wet process" for producing sodium borates.

Most commercial sodium borates as, for example, sodium tetraborate decahydrate (borax) and sodium tetraborate pentahydrate are produced from ores containing crude borates combined with a gangue and small amounts of various impurities, among which calcium is a particularly troublesome impurity.

The common method for the recovery of the sodium borates is a "wet process" in which the ore is pulverized and is treated in a dissolver with water or a mother liquor containing sodium borate. It is to be clearly understood that it is immaterial to the present invention whether the crushed ore is dissolved in plain water or a mother liquor containing sodium borate dissolved therein. The sodium borate dissolves in the water or the mother liquor and is separated from the gangue as by settling and/or filtration and the desired sodium borate is then separated from the clarified solution as by crystallization. The solutions of the sodium borate ores contain on the order of from about 300 to 700 parts per million calcium oxide which tends to deposit in the pipe lines and presents a problem in the transferring of the sodium borate solution from the dissolving unit to the crystallizing units.

Sodium borate solutions containing in excess of about 40 parts per million calcium, measured as calcium oxide, tend to deposit calcium salts in pipe lines, and in a comparatively short period of time the deposits are so great as to completely stop the flow of solution through these pipe lines. Cleaning the deposits from the pipe lines requires stopping the entire process and results in considerable poduction losses.

It is, therefore, the principal object of the present invention to provide a "wet process" for the production of sodium borates wherein calcium deposition is virtually eliminated.

It is a further object of this invention to provide a method for removing calcium from sodium borate solution which is efficient and economically desirable.

Other objects will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the many ways in which the principle of the invention may be employed.

Broadly stated, the present invention comprises the method for producing sodium borates which comprises adding probertite to an aqueous solution of sodium borate containing calcium as a contaminant, allowing the probertite to settle whereby substantially all the calcium in said solution is carried down with said probertite, separating the sodium borate solution from said probertite and calcium contaminant and crystallizing sodium borate from said solution.

Probertite is a sodium calcium borate mineral with the chemical formula $$Na_2O \cdot 2CaO \cdot 5B_2O_3 \cdot 10H_2O$$

and for all practical purposes is insoluble in sodium borate solution. It is my theory that probertite, when added to sodium borate solutions containing calcium as a contaminant, acts as a seed crystal and brings about the crystallization of additional probertite from the original solution. Whether my theory is correct is immaterial since the fact remains that the use of probertite results in borate solutions substantially free of calcium. For speed of reaction in the preferred embodiment of the invention I use from about 5% to about 15% probertite by weight of solution. Solutions containing from 300 to 700 parts per million calcium, measured as calcium oxide, can be brought below 40 parts per million calcium in less than 15 minutes by using the probertite.

If desired, the sodium borate solution, high in calcium content, can be continuously passed through a bed of probertite where it is in intimate contact with the probertite for at least five minutes.

So that the present invention is more clearly understood, the following examples are given for illustrative purposes:

In all of the following examples the solution temperature was maintained at 95° C.

I

Pulverized ore was dissolved in water to make a solution containing about 42% sodium tetraborate decahydrate. The solution and clay slimes were decanted from the coarse gangue. The solution was then decanted and filtered and the clarified solution free of clay slimes was sampled for calcium oxide content. 7.8% probertite was added to the clarified solution and this solution was stirred for about fifteen minutes and filtered. Chemical analysis yielded the following data:

CaO content of original solution—457 p.p.m.
CaO content 15 minutes after probertite addition—35 p.p.m.

II

Pulverized ore was dissolved in mother liquor containing sodium borate to make a solution containing about 43% sodium tetraborate decahydrate. The solution and clay slimes were decanted from the coarse gangue. The solution was then decanted and filtered and the clarified solution free of clay slimes was sampled for calcium oxide content. 10.4% probertite was added to the clarified solution with stirring and samples of the solution were taken after fifteen and thirty minutes, filtered and analyzed.

CaO content of original solution—527 p.p.m.
CaO content 15 minutes after probertite addition—32 p.p.m.
CaO content 30 minutes after probertite addition—21 p.p.m.

III

Pulverized ore was dissolved in water to make a solution containing about 42.5% sodium tetraborate decahydrate. The solution and clay slimes were decanted from the coarse gangue. The solution was then decanted and a sample of the clarified solution was analyzed for calcium oxide.

The clarified solution was then passed through a bed containing probertite at a measured flow rate. The contact time of the solution with probertite was 15 minutes. Samples of the solution after passing through the seed bed were taken and chemical analysis yielded the following data:

CaO content of original solution—328 p.p.m.
CaO content after passing through the seed bed—31 p.p.m.

IV

A clarified solution of sodium borate was prepared as in Example III. The clarified solution was passed through the probertite bed so that the contact time was ten minutes. Chemical analysis yielded the following data:

CaO content of original solution—352 p.p.m.
CaO content after passage through the seed bed—36 p.p.m.

V

The clarified solution of Example IV was used and the contact time of the solution and the probertite bed was controlled at seven minutes. Chemical analysis yielded the following data:

CaO content of original solution—352 p.p.m.
CaO content after passage through the seed bed—40 p.p.m.

As can be seen from the foregoing examples, the use of probertite for removing calcium from sodium borate solutions is rapid and efficient.

Other modes of applying the principle of the invention may be employed, change being made as regards the details described, provided the features as stated in any of the following claims or the equivalent of such be employed.

I, therefore, particularly point out and distinctly claim as my invention:

1. The method for producing sodium borates which comprises adding probertite to an aqueous solution of sodium borate containing calcium as a contaminant, allowing the probertite to settle whereby substantially all of the calcium in said solution is carried down with said probertite, separating the sodium borate solution from said probertite and calcium contaminant and crystallizing sodium borate from said solution.

2. The method for producing sodium borates which comprises adding from about 5% to about 15% of probertite to an aqueous solution of sodium borate containing calcium as a contaminant, allowing the probertite to settle whereby substantially all of the calcium in said solution is carried down with said probertite, separating the sodium borate solution from said probertite and calcium contaminant and crystallizing sodium borate from said solution.

3. The method for producing sodium borate which comprises passing an aqueous solution of sodium borate containing calcium as a contaminant through a bed of probertite whereby said calcium is removed in said bed of probertite, recovering the resultant sodium borate solution and crystallizing sodium borate from said solution.

References Cited in the file of this patent

UNITED STATES PATENTS 1,468,366    Kelly _____ Sept. 18, 1923

OTHER REFERENCES

Dana's: "A Textbook of Mineralogy," 4th Ed., revised, 1932, page 745. John Wiley and Sons, Inc., N.Y.